(12) United States Patent
Etchason (10) Patent No.: US 8,801,562 B2
(45) Date of Patent: Aug. 12, 2014

(54) MULTI-SPEED AUTOMATIC TRANSMISSION WITH FAST REVERSE

(71) Applicant: Allison Transmission, Inc., Indianapolis, IN (US)

(72) Inventor: Edmond M. Etchason, New Palestine, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 11 days.

(21) Appl. No.: 13/775,336

(22) Filed: Feb. 25, 2013

(65) Prior Publication Data

US 2013/0225357 A1    Aug. 29, 2013

Related U.S. Application Data

(60) Provisional application No. 61/603,990, filed on Feb. 28, 2012.

(51) Int. Cl.
*F16H 3/62* (2006.01)

(52) U.S. Cl.
USPC ........................................................ 475/275

(58) Field of Classification Search
None
See application file for complete search history.

(56) References Cited

U.S. PATENT DOCUMENTS

| | | | | |
|---|---|---|---|---|
| 7,285,069 | B2 * | 10/2007 | Klemen | 475/275 |
| 8,002,662 | B2 * | 8/2011 | Phillips et al. | 475/282 |
| 2005/0113205 | A1 | 5/2005 | Oguri et al. | |
| 2009/0305838 | A1 | 12/2009 | Borgerson et al. | |
| 2010/0240488 | A1 | 9/2010 | Carey et al. | |
| 2013/0157796 | A1 * | 6/2013 | Etchason | 475/275 |

FOREIGN PATENT DOCUMENTS

| | | |
|---|---|---|
| EP | 2167843 B1 | 9/2011 |
| KR | 100298742 B1 | 11/2001 |

OTHER PUBLICATIONS

International Searching Authority (ISA)/KR: Mailing of "Notification of Transmittal of the International Search Report and the Written Opinion of the International Searching Authority, or the Declaration", Dated: May 29, 2013.

* cited by examiner

*Primary Examiner* — Dirk Wright
(74) *Attorney, Agent, or Firm* — Taft Stettinius & Hollister LLP; Stephen F. Rost (57) ABSTRACT

The present disclosure provides an automatic transmission having an input adapted to couple to a torque-generating mechanism and an output coupled to the input. The transmission also includes a first rotating torque-transferring mechanism disposed along a first torque path and coupled to the input. A second rotating torque-transferring mechanism is disposed along a second torque path and is coupled to the input independent of the first torque-transferring mechanism. The transmission includes a plurality of stationary torque-transferring mechanisms, each of which is disposed between the input and output. The transmission includes a first planetary gearset, a second planetary gearset, a third planetary gearset, and a fourth planetary gearset, where each gearset includes a sun gear, a ring gear, and a carrier assembly. Moreover, the ring gear of the third planetary gearset is coupled to the carrier assembly of the second planetary gearset and the carrier assembly of the fourth planetary gearset.

20 Claims, 3 Drawing Sheets

MULTI-SPEED AUTOMATIC TRANSMISSION WITH FAST REVERSE

RELATED APPLICATIONS

This application claims priority to U.S. Provisional Patent Application Ser. No. 61/603,990, filed Feb. 28, 2012, which is hereby incorporated by reference in its entirety.

FIELD OF THE DISCLOSURE

The present disclosure relates to a gearing arrangement for a transmission, and in particular to a planetary gearing arrangement for an automotive transmission having a Polak gearing arrangement.

BACKGROUND

A conventional transmission for a powered vehicle can include a gearbox, i.e., gears, synchronizers, dog clutches, clutch plates and reaction plates, a number of automatically selectable gears, planetary gear sets, hubs, pistons, shafts, and other housings. The clutches can be stationary brakes/clutches or rotating clutches. The transmission can have an internal shaft which rotates one or more clutches or shafts in the transmission.

The number of clutches and gear schemes can be used to achieve different gear ratios. Each gear ratio can define a range in which the transmission operates. A higher numerical gear ratio, for example, can be achieved at a lower transmission output speed. This can be important if a vehicle is heavily loaded or requires higher torque to ascend an elevation, for instance. Alternatively, a lower numerical gear ratio can be achieved at a higher transmission output speed, particularly when a vehicle is travelling at higher speeds on a highway. The lower numerical gear ratio can help increase fuel efficiency at these speeds.

To achieve different gear ratios, gear schemes are configured in which brakes, clutches, shafts, and gearsets are packaged in a transmission. The gear scheme can include one or more planetary gearsets. A planetary gearset can include a sun gear, a ring gear, and a carrier. One or more of the sun gear, ring gear, and carrier can be input or output of the planetary gearset. The manner in which torque is transmitted through the clutches and gearsets determines the different gear ratios for a given transmission.

In some arrangements, however, the reverse gear ratio may be numerically too large to obtain a required reverse speed. In addition, the gear step between the first and second forward gears may be too large to permit the 1-2 and 2-1 shifts to be made with the torque converter clutch applied. Making these shifts with the torque converter clutch applied can improve transmission efficiency, fuel economy, and reduce transmission heat generation. Gear step is defined in the present disclosure as the ratio of two gear ratios.

There is a need for an automatic transmission having a gearing arrangement for automatically selecting gears and which the gearbox is configured for an available fast reverse and a close gear step 1-2 shift.

SUMMARY

In an exemplary embodiment of the present disclosure, an automatic transmission is provided having an input adapted to couple to a torque-generating mechanism and an output coupled to the input. The transmission also includes a first rotating torque-transferring mechanism disposed along a first torque path and coupled to the input. A second rotating torque-transferring mechanism is disposed along a second torque path and is coupled to the input independent of the first torque-transferring mechanism. The transmission includes a plurality of stationary torque-transferring mechanisms, each of which is disposed between the input and output. The transmission includes a first planetary gearset, a second planetary gearset, a third planetary gearset, and a fourth planetary gearset, where each gearset includes a sun gear, a ring gear, and a carrier assembly. Moreover, the ring gear of the third planetary gearset is coupled to the carrier assembly of the second planetary gearset and the carrier assembly of the fourth planetary gearset.

In one aspect of this embodiment, the sun gear of the first planetary gearset is coupled to the input along a third torque path and the ring gear of the first planetary gearset is coupled to the first stationary torque-transferring mechanism. In another aspect, the ring gear of the fourth planetary gearset is coupled to the fourth stationary torque-transferring mechanism and the carrier assembly of the fourth planetary gearset. In a different aspect, the first rotating torque-transferring mechanism, second rotating torque-transferring mechanism, first stationary torque-transferring mechanism, second stationary torque-transferring mechanism, third stationary torque-transferring mechanism, and fourth stationary torque-transferring mechanism are engaged in combinations of at least two to establish at least seven forward speed ratios and two reverse speed ratios between the input and the output. Here, the gear step between the first forward speed ratio and second forward speed ratio can be about 1.5 or less.

In a related aspect, the first torque path is at least partially defined by the input, the first rotating torque-transferring mechanism, the sun gear of the second planetary gearset, and the sun gear of the third planetary gearset. The second torque path is at least partially defined by the input, the second rotating torque-transferring mechanism, and the carrier assembly of the second planetary gearset. In a further aspect, the carrier assembly of the first planetary gearset is coupled to the ring gear of the second planetary gearset; the carrier assembly of the second planetary gearset is coupled to the ring gear of the third planetary gearset; and the carrier assembly of the third planetary gearset is coupled to the sun gear of the fourth planetary gearset and the output. In yet a further aspect, the ring gear of the third planetary gearset is coupled to at least three carrier assemblies and one stationary torque-transferring mechanism. Moreover, a third torque path is at least partially defined by the input, the sun gear of the first planetary gearset, and the carrier assembly of the first planetary gearset.

In another embodiment, a gear scheme of an automatic transmission is provided. The gear scheme includes a transmission input and a transmission output, the input adapted to be coupled to a torque-generating mechanism. The scheme also includes a first rotating torque-transferring mechanism and a second rotating torque-transferring mechanism, each being independently coupled to the transmission input. A first planetary gearset is coupled to the first rotating torque-transferring mechanism, where the first planetary gearset is coupled to a first stationary torque-transferring mechanism. A second planetary gearset is coupled to the first planetary gearset and the first rotating torque-transferring mechanism, where the second planetary gearset is coupled to a second stationary torque-transferring mechanism. A third planetary gearset is coupled to the second rotating torque-transferring mechanism and the transmission output, where the third planetary gearset is coupled to a third stationary torque-transferring mechanism. In addition, a fourth planetary gearset is coupled to the third planetary gearset and a fourth stationary torque-transferring mechanism. The fourth planetary gearset includes a sun gear, a ring gear, and a carrier assembly, where the ring gear is coupled to the fourth stationary torque-transferring mechanism.

In one aspect of this embodiment, the third planetary gearset comprises a sun gear, a ring gear, and a carrier assembly, the ring gear of the third planetary gearset being coupled to the carrier assembly of the fourth planetary gearset. In a second aspect, the first planetary gearset comprises a sun gear, a ring gear, and a carrier assembly, the sun gear of the first planetary gearset being coupled to the transmission input and the ring gear of the first planetary gearset is coupled to the first stationary torque-transferring mechanism. Here, a torque path is defined between the transmission input and transmission output, where the sun gear and carrier assembly of the first planetary gearset are disposed along the torque path.

In another aspect, a first torque path is defined between the input and the output of the transmission, where the first rotating torque-transferring mechanism, an input of the second planetary gearset, an input of the third planetary gearset, and an output of the third planetary gearset are disposed along the first torque path. In a different aspect, a second torque path is defined between the input and the output of the transmission, where the second rotating torque-transferring mechanism, a ring gear of one of the planetary gearsets, and at least two carrier assemblies of the planetary gearsets are disposed along the second torque path.

In a related embodiment, the first rotating torque-transferring mechanism, second rotating torque-transferring mechanism, first stationary torque-transferring mechanism, second stationary torque-transferring mechanism, third stationary torque-transferring mechanism, and fourth stationary torque-transferring mechanism are engaged in combinations of at least two to establish at least seven forward speed ratios and two reverse speed ratios between the transmission input and the transmission output. Here, the gear step between the first forward speed ratio and second forward speed ratio can be about 1.5 or less. Moreover, in another related aspect, the third planetary gearset includes a ring gear being coupled to at least three carrier assemblies and the third stationary torque-transferring mechanism. In a similar aspect, the first planetary gearset includes a carrier assembly being coupled to the second planetary gearset, the second planetary gearset includes a carrier assembly being coupled to the third planetary gearset, and the third planetary gearset includes a carrier assembly being coupled to the sun gear of the fourth planetary gearset and the transmission output.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
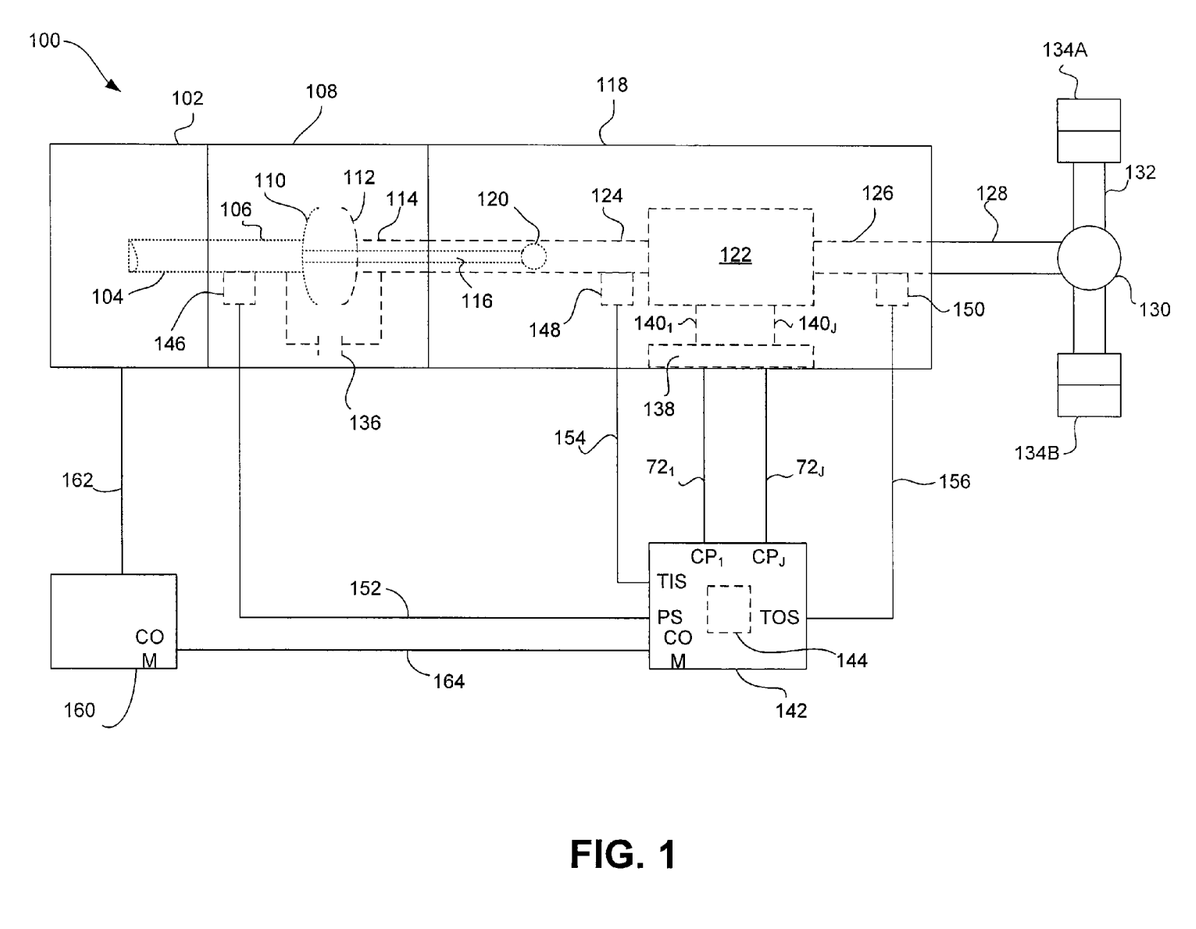
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150. The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols.

Figure 2:
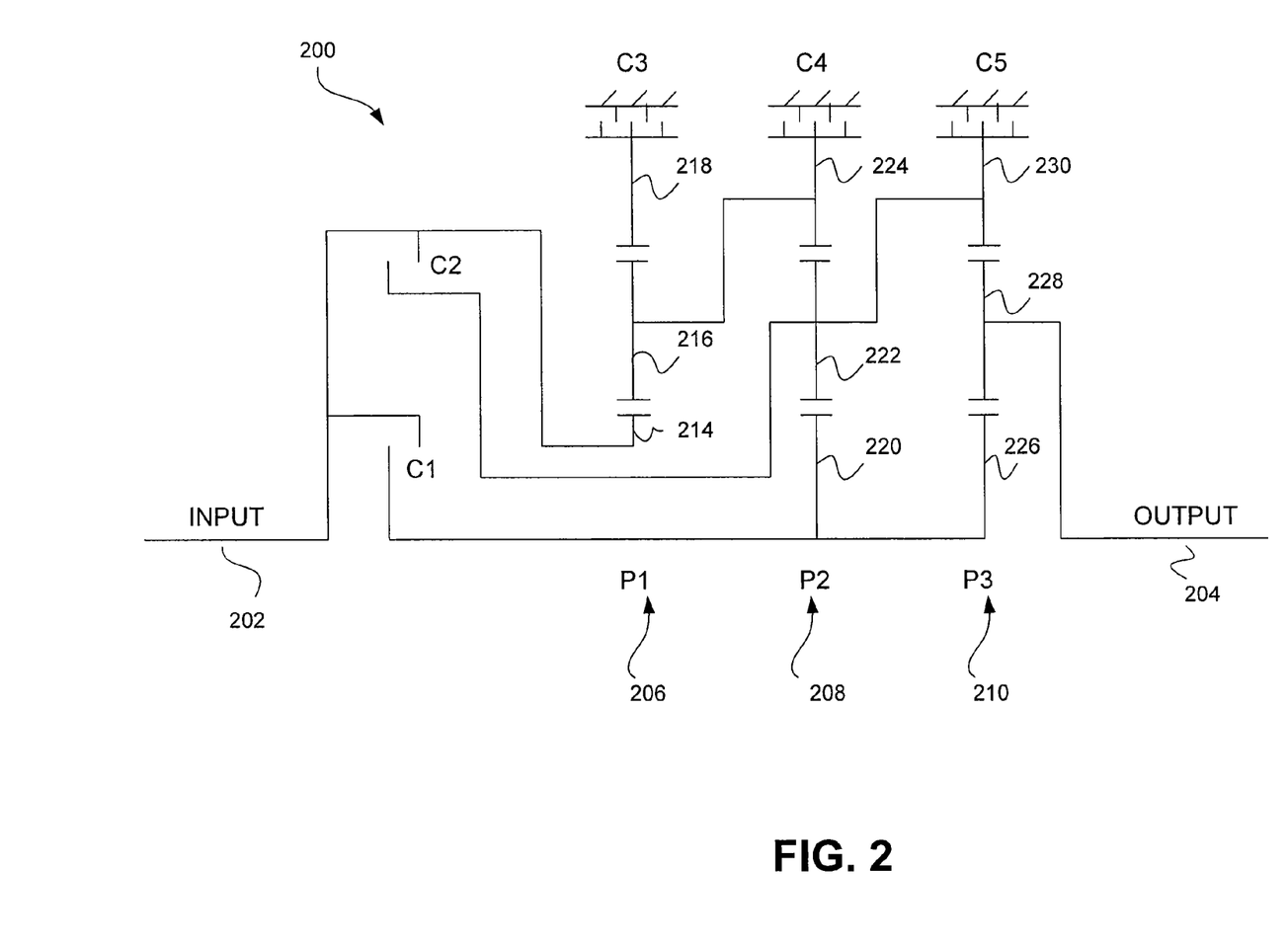
FIG. 2 is a first gearing scheme for a multi-speed automatic transmission.

With reference to FIG. 2, an exemplary gearing scheme 200 is provided for transferring torque from an input 202 of the transmission to an output 204 thereof. The input 202 and output 204 can be disposed along the same centerline as shown in FIG. 2. Moreover, the gearing scheme 200 further includes a plurality of clutches. The plurality of clutches can include a pair of rotating clutches, i.e., C1 and C2, and three stationary clutches or brakes, i.e., C3, C4, and C5. Each of the clutches or brakes can include one or more plates. The plates can include friction material and thus comprise friction plates, whereas other plates can be reaction plates.

The gearing scheme 200 can also include a plurality of planetary gearsets. For example, in FIG. 2, the scheme 200 includes a first planetary gearset 206, a second planetary gearset 208 and a third planetary gearset 210. For purposes of this disclosure, the first planetary gearset can be referred to as a P1 planetary gearset. Likewise, the second and third planetary gearsets can be referred to as P2 and P3, respectively. Each planetary gearset can include a sun gear, a ring gear, and a carrier. For instance, the P1 planetary gearset 206 includes a P1 sun gear 214, a P1 carrier 216, and a P1 ring gear 218. The P2 planetary gearset 208 includes a P2 sun gear 220, a P2 carrier 222, and a P2 ring gear 224. Similarly, the P3 planetary gearset 210 includes a P3 sun gear 226, a P3 carrier 228, and a P3 ring gear 230.

In FIG. 2, the lines connecting the different components can refer or indicate paths through which torque can be transferred. In addition, where the lines are broken and horizontal lines are shown (e.g., forming an equal sign ("=")), these locations can refer to gears meshing (or, alternative embodiments, being splined) to one another. For instance, the P1 sun gear 214 is shown meshing with pinion gears coupled to the P1 carrier 216 and the pinion gears of the P1 carrier 216 are meshing with the P1 ring gear 218. When the C1 or C2 clutch is unapplied, torque does not pass through the clutches. Similarly, when the C3 clutch (or brake) is applied, for example, the P1 ring gear 218 is held and cannot rotate. From this point forward, the C1 and C2 clutches will be referred to as "clutches" whereas the C3-C5 clutches will be referred to as "brakes", but it should be understood that these components may be different in other embodiments.

In the present disclosure, the gearing scheme 200 is such that two clutches (or two brakes or one clutch and one brake) are applied to achieve a particular range or gear ratio. In other gearing scheme embodiments, however, a range may be achieved by applying any combination of clutches or brakes (e.g., one clutch, three clutches, four clutches, etc.).

In one particular embodiment, a gearing scheme can be arranged such that the following gear ratio ranges are achieved for different ranges:

| Gear Range | Gear Ratio | Applied Clutches or Brakes |
| --- | --- | --- |
| F1 | 2.5-6.0 | C1 & C5 |
| F2 | 1.5-4.5 | C1 & C4 |
| F3 | 1.1-3.0 | C1 & C3 |
| F4 | 0.9-1.1 | C1 & C2 |
| F5 | 0.25-0.99 | C2 & C3 |
| F6 | 0.25-0.99 | C2 & C4 |
| Reverse | (−3.0)-(−7.0) | C3 & C5 |

"F1" refers to a first forward range, "F2" refers to a second forward range, etc. The combination of gear ratios, ranges, and applied clutches and brakes is exemplary and non-limiting. Other embodiments are possible in which additional or fewer ranges are possible. The gear ratio can also be adjusted as desired to accommodate a close ratio or wide ratio transmission. As is known, the difference between a close ratio and wide ratio transmission is the number of gear teeth on the various parts of the planetary gearsets.

Figure 3:
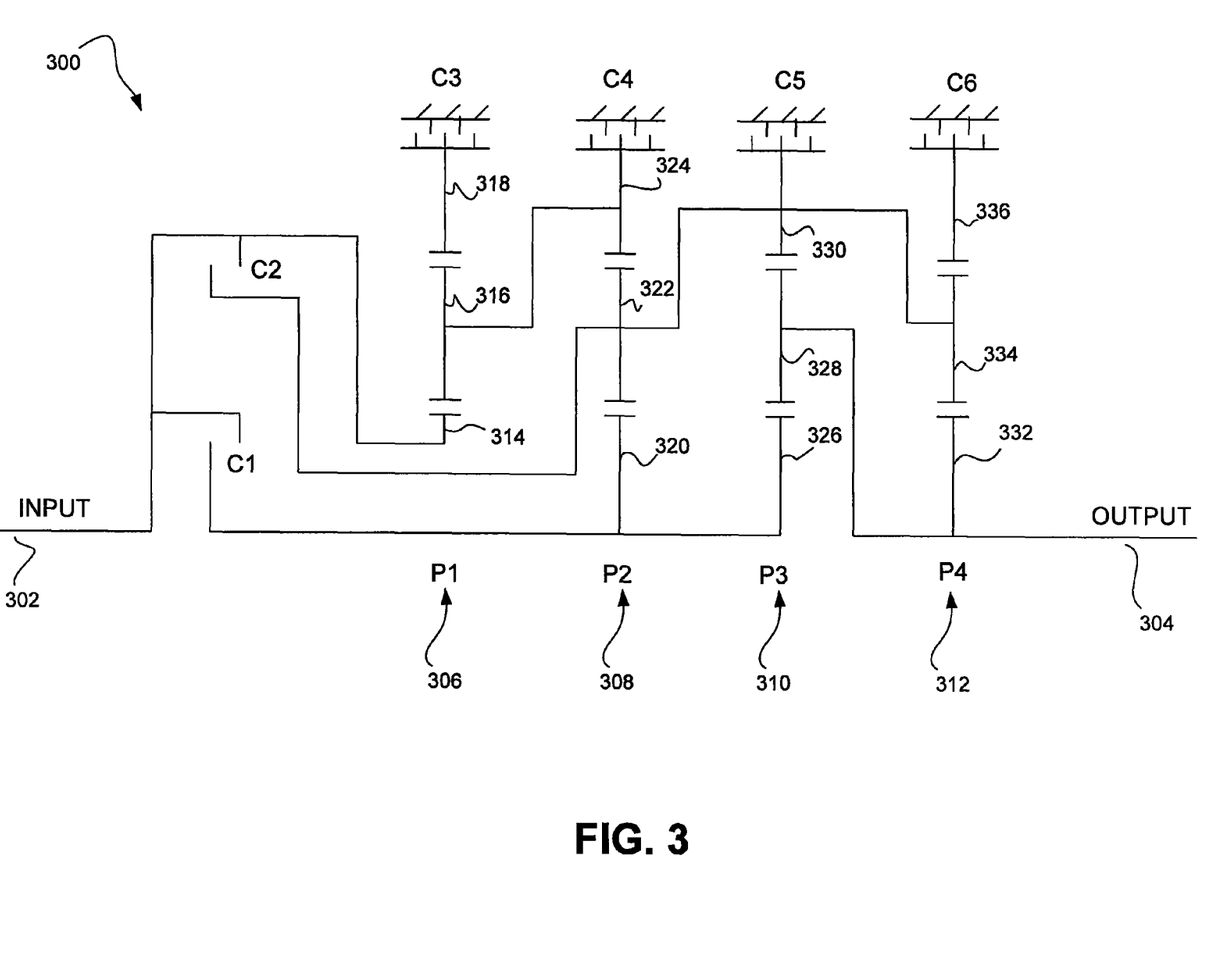
FIG. 3 is a second gearing scheme for an improved multi-speed automatic transmission with a fast reverse speed and close gear step 1-2 shift capability.

In the gearing scheme 200, the reverse gear ratio may be too slow to meet the needs of a customer requiring a faster reverse ratio. In addition, the large F1 to F2 gear step prevents the shift from being made with the torque converter clutch applied, which can result in lower transmission efficiency, lower fuel economy, and higher transmission heat generation. In the present disclosure, however, an improved gearing scheme 300 can overcome such limitations so that the transmission can provide a reverse ratio that allows a vehicle to move faster in reverse than conventional reverse ranges in multi-ratio transmissions. Further, the F1 to F2 shift can be made with the torque converter clutch applied.

In the first forward range, F1, of gear scheme 200, the torque path through the transmission is such that the C1 clutch and C5 brake are applied. When the C5 brake is applied, it prevents the P3 ring gear 230 from rotating. With the P3 ring gear 230 stopped, the P3 sun gear 226 is an input of torque and the P3 carrier 228 is the output. Here, the P3 sun gear 226 and P3 carrier 228 rotate in the same direction, but the P3 carrier 228 rotates at a slower speed.

Referring to FIG. 2, the reverse range, R, can be achieved by applying the C3 and C5 brakes. Both of these brakes are stationary and hold ring gears from rotating. Specifically, the C3 brake holds the P1 ring gear 218 and the C5 brake holds the P3 ring gear 230. Since neither the C1 nor C2 clutches are applied, torque is transferred from the transmission input 202 to the first planetary gearset 206 via the P1 sun gear 214. Since the P1 ring gear 218 is held, the P1 carrier 216 rotates in the same direction as the P1 sun gear 214, albeit at a slower speed, and transfers torque to the P2 planetary gearset 208 via the P2 ring gear 224.

Since the C5 brake holds the P3 ring gear 230, the P2 carrier 222 cannot rotate. As such, the P2 sun gear 220 is the output of the P2 planetary gearset 208. Since the P2 carrier 222 is held, the P2 ring gear 224 and P2 sun gear 220 rotate in opposite directions relative to each other, but with the P2 sun gear 220 rotating at a higher speed than the P2 ring gear 224. With the P2 sun gear 220 now rotating in an opposite direction from the transmission input, the P2 sun gear 220 also drives the P3 sun gear 226 to rotate in the opposite direction of the transmission input 202. The P3 sun gear 226 continues to drive the P3 carrier 228 in the opposite direction of the transmission input 202, albeit at a slower speed, and thus the transmission output 204 (which is driven by the P3 carrier 228) rotates in the reverse direction (i.e., opposite from the direction of which the transmission input 202 rotates).

Referring to FIG. 3, another exemplary embodiment of a gear scheme 300 is shown. The gear scheme 300 in FIG. 3 is similar to the gear scheme 200 of FIG. 2, except for the addition of a fourth planetary gearset 312. Thus, the inputs and outputs of the P1 carrier, P2 carrier, and P3 carrier in the gear scheme 300 are the same as the previously described gear scheme 200.

As shown, the gear scheme 300 can include a transmission input 302, a transmission output 302, two rotating clutches, C1 and C2, and four stationary brakes, i.e., C3, C4, C5, and C6. The input 302 and output 304 can be disposed along the same transmission centerline as shown in FIG. 3. Alternatively, the input 302 and output 304 can be disposed along different centerlines. The gear scheme 300 also can include a first planetary gearset 306, a second planetary gearset 308, a third planetary gearset 310, and a fourth planetary gearset 312. The first planetary gearset 306, referred to herein as the P1 planetary gearset, can include a P1 sun gear 314, a P1 carrier 316, and a P1 ring gear 318. Likewise, the second planetary gearset 308, or P2 planetary gearset, can include a P2 sun gear 320, a P2 carrier 322, and a P2 ring gear 324. The third planetary gearset 310, or P3 planetary gearset, can include a P3 sun gear 326, a P3 carrier 328, and a P3 ring gear 330. Similarly, the fourth planetary gearset 312, or P4 planetary gearset, can include a P4 sun gear 332, a P4 carrier 334, and a P4 ring gear 336.

The gear scheme 300 can include similar ranges, gear ratios, and applied/unapplied clutches as described above with respect to gear scheme 200. Thus, in a first forward range or speed ratio, F1, the C1 clutch and C5 brake can be applied. In this embodiment, the P3 ring gear 330 is held fixed by the C5 brake. Torque therefore passes through the P3 planetary gearset 310 via the P3 sun gear 326 and it outputs through the P3 carrier 328. The P3 sun gear 326 and P3 carrier 328 rotate in the same direction, but the P3 carrier 328 rotates at a slower speed multiplying torque to the transmission output 304 by the same ratio as gear scheme 200.

In reverse, however, the gear scheme 300 differs over the previous gear scheme 200. The addition of the fourth planetary gearset 312 in FIG. 3 results in two available reverse gear or speed ratios. R1, or a first reverse gear or speed ratio of gear scheme 300, has a similar torque path and gear ratio as the single reverse ratio in the gear scheme 200 of FIG. 2. R2, or a second reverse gear or speed ratio of gear scheme 300, has a "faster" reverse gear or speed ratio than the single reverse gear or speed ratio of gear scheme 200. For purposes of this disclosure, the "faster" reverse gear or speed ratio (R2) in scheme 300 means the numerical gear or speed ratio is smaller than the single reverse gear or speed ratio of scheme 200. In addition, a reverse range can refer to a gear ratio or speed ratio for purposes of this disclosure.

The second reverse ratio, R2, of scheme 300 can be achieved by applying the C3 and C6 brakes. Both of these brakes can be stationary brakes (i.e., not rotating) and hold corresponding ring gears from rotating. Specifically, the C3 brake holds the P1 ring gear 318 and the C6 brake holds the P4 ring gear 336. Since neither the C1 nor C2 clutches are applied, torque is transferred from the transmission input 302 to the first planetary gearset 306 via the P1 sun gear 314. Since the P1 ring gear 318 is held, the P1 carrier 316 rotates in the same direction as the P1 sun gear 314, albeit at a slower speed, and transfers torque to the P2 planetary gearset 308 via the P2 ring gear 324.

With the transmission output 304 rotating in the reverse direction and the P4 ring gear 336 held, the P4 carrier 334, P3 ring gear 330, and P2 carrier 322 all rotate in the reverse direction as well. Now, with the P2 ring gear 324 rotating forward and the P2 carrier 322 rotating in reverse, the P2 sun gear 320 and the P3 sun gear 326 rotate at a high speed in reverse. Since the P3 sun gear 326 and P3 ring gear 330 are both rotating in the reverse direction, the P3 carrier 328 and the transmission output 304 rotate at a relatively high speed in the second reverse ratio, R2, of gear scheme 300 compared to the single reverse ratio of gear scheme 200 and the first reverse ratio, R1, of gear scheme 300. In one non-limiting embodiment, R2 of gear scheme 300 can have a gear ratio of about −1.95 while the single reverse ratio in gear scheme 200 and first reverse ratio, R1, of gear scheme 300 have gear ratios of about −4.80. The second reverse ratio, R2, of gear scheme 300 can therefore provide a faster vehicle speed in reverse for those vocations requiring it.

Gear scheme 300 can also provide an additional forward gear ratio that fits between the F1 and F2 gear ratios of gear scheme 200. This allows for seven forward speeds to be available with gear scheme 300 and can reduce the large gear step typically associated with the F1 to F2 shift of gear scheme 200. The F1 torque path and gear ratio of gear scheme 300 are similar to that of the F1 torque path in gear scheme 200. The F3 torque path and gear ratio of gear scheme 300 are similar to that as F2 of gear scheme 200, and likewise the pattern for the remaining higher forward ranges of gear scheme 300 are similar to those of the gear scheme 200. However, the F2 torque path and gear ratio of gear scheme 300 are different from that of the gear scheme 200.

The second forward range, F2, of gear scheme 300 can be achieved by applying the C1 clutch and C6 brake. In FIG. 3, the P4 ring gear 336 is held by the C6 brake. Input into the P3 sun gear 326 of the P3 planetary gearset 310 is via the applied C1 clutch. The P3 sun gear 326 can transfer torque to the P3 carrier 328 which drives the transmission output 304. The P3 sun gear 326 and P3 carrier 328 rotate in the forward direction and further drive the P4 sun gear 332. With the P4 ring gear 336 being held, the P4 sun gear 332 drives the P4 carrier 334. The P4 carrier 334 rotates in the forward direction and further drives the P3 ring gear 330. Since the P3 ring gear 330 is rotating forward rather than being fixed as in F1, it combines with the forward rotation of the P3 sun gear 326 to drive the P3 carrier 328 and transmission output 304 at a faster rotational speed in the forward direction than that of F1, but slower than that of F3 of gear scheme 300.

In one non-limiting aspect of this embodiment, the F1 and F2 forward ranges in gear scheme 200 can have gear ratios of approximately 3.51 and 1.91 with a gear step of 1.84 therebetween. In gear scheme 300, however, forward ranges F1, F2, and F3 can have respective gear ratios of 3.51, 2.56, and 1.91 with gear steps of 1.37 and 1.34. As a result, a gear step at about or below 1.5 formed between forward ranges F1 and F2 of gear scheme 300 can allow the shift from F1 to F2 to be made with the torque converter clutch applied, thereby improving transmission efficiency and fuel economy while reducing transmission heat generation.

As for the other forward ranges in gear scheme 300, the torque flow path between the transmission input 302 and transmission output 304 is similar to the other forward ranges in gear scheme 200. For instance, in a third forward range F3 of gear scheme 300, the C4 brake holds the P2 ring gear 324 and the C1 clutch is applied. Torque therefore passes through the P2 planetary gearset 308 via the P2 sun gear 320 and is output through the P2 carrier 322. The P2 carrier 322 rotates in the same direction as the P2 sun gear 320 and is coupled to the P3 ring gear 330. Torque also passes through the P3 planetary gearset 310 as an input via the P3 sun gear 326. The P3 carrier 328 outputs torque to the transmission output 304 as shown.

In a fourth forward range F4 of gear scheme 300, the C3 brake can hold the first ring gear 318 and the C1 clutch is applied. Torque can therefore enter the P1 planetary gearset 306 via the P1 sun gear 314 and output via the P1 carrier 316. The P1 carrier 316 is coupled to the P2 ring gear 324, and as a result torque passes through the P2 planetary gearset 308 through the P2 ring gear 324 (via the P1 carrier 316) and the P2 sun gear 320. The P2 carrier 322 is the output of the P2 planetary gearset 308 and transfers torque to the P3 ring gear 330. Thus, torque passes through the P3 planetary gearset 310 via the P3 ring gear 330 (via the P2 carrier) and P3 sun gear 326. The P3 carrier 328 outputs torque to the transmission output 304.

In a fifth forward range F5 of gear scheme 300, the C1 and C2 clutches are applied, but none of the stationary brakes are applied. Thus, torque from the transmission input 302 enters the P3 planetary gearset 310 via the P3 sun gear 326 and the P3 ring gear 330 (i.e., via the P2 carrier 322). With the P3 sun gear 326 and P3 ring gear 330 rotating at input speed, the P3 carrier 328 and transmission output 304 rotate at input speed thereby resulting in a gear ratio of approximately 1.0.

In a sixth forward range F6 of gear scheme 300, the C2 clutch and C3 brake are applied. Unlike the previously described embodiments, the C1 clutch is not applied. The C3 brake holds the P1 ring gear 318. Torque therefore passes through the P1 planetary gearset 306 via the P1 sun gear 314 and is output through the P1 carrier 316. Torque passes through the P2 planetary gearset 308 through the P2 ring gear 324 (via the P1 carrier 316), P2 carrier 322, and the P3 ring gear 330 (via the applied C2 clutch). This overdrives the P2 sun gear 320 and the P3 sun gear 326. With the P3 sun gear 326 being overdriven and the P3 ring gear rotating at input speed, the P3 carrier 328 and transmission output 304 are overdriven. In this disclosure, the "overdriven" condition refers to the transmission output 304 rotating at a higher speed than the transmission input 302.

In a seventh forward range F7 of gear scheme 300, the C2 clutch and C4 brake are applied or held. In this range, the C4 brake holds the P2 ring gear 324. Torque is input to the P2 planetary gearset 308 directly from the transmission input 302 to the P2 carrier 322 and P3 ring gear 330. This condition overdrives the P2 sun gear 320 and P3 sun gear 326 to a larger degree than the sixth forward range F6 of gear scheme 300. With the P3 sun gear 326 being overdriven to a greater degree and the P3 ring gear 330 rotating at input speed, the P3 carrier 328 and transmission output 304 are overdriven to a larger degree than in the sixth forward range F6 of gear scheme 300.

In the above-described embodiments, the torque flow paths can differ depending on the gear scheme and which clutches or brakes are applied/unapplied. In one embodiment, the gear ratio in the first forward range F1 is greater than the gear ratios for the second (F2), third (F3), fourth (F4), fifth (F5), sixth (F6), and seventh forward ranges (F7). The gear ratio in the seventh forward range F7 is less than the gear ratios in the first, second, third, fourth, fifth, and sixth forward ranges. With the ability to achieve a second range in reverse and an additional forward range, thereby providing smaller gear steps between ranges, the gear scheme 300 can achieve efficiency and fuel economy advantages over many conventional gearing arrangements.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An automatic transmission, comprising:
an input adapted to couple to a torque-generating mechanism;
an output coupled to the input;
a first rotating torque-transferring mechanism disposed along a first torque path, the first rotating torque-transferring mechanism being coupled to the input;
a second rotating torque-transferring mechanism disposed along a second torque path, the second rotating torque-transferring mechanism being coupled to the input independent of the first torque-transferring mechanism;
a first stationary torque-transferring mechanism, a second stationary torque-transferring mechanism, a third stationary torque-transferring mechanism, and a fourth stationary torque-transferring mechanism, each of the stationary torque-transferring mechanisms being disposed between the input and the output; and
a first planetary gearset, a second planetary gearset, a third planetary gearset, and a fourth planetary gearset, where each planetary gearset includes a sun gear, a ring gear, and a carrier assembly;
wherein, the ring gear of the third planetary gearset is coupled to the carrier assembly of the second planetary gearset and the carrier assembly of the fourth planetary gearset.

2. The automatic transmission of claim 1, wherein the sun gear of the first planetary gearset is coupled to the input along a third torque path and the ring gear of the first planetary gearset is coupled to the first stationary torque-transferring mechanism.

3. The automatic transmission of claim 1, wherein the ring gear of the fourth planetary gearset is coupled to the fourth stationary torque-transferring mechanism and the carrier assembly of the fourth planetary gearset.

4. The automatic transmission of claim 1, wherein the first rotating torque-transferring mechanism, second rotating torque-transferring mechanism, first stationary torque-transferring mechanism, second stationary torque-transferring mechanism, third stationary torque-transferring mechanism, and fourth stationary torque-transferring mechanism are engaged in combinations of at least two to establish at least seven forward speed ratios and two reverse speed ratios between the input and the output.

5. The automatic transmission of claim 4, wherein the gear step between the first forward speed ratio and second forward speed ratio is about 1.5 or less.

6. The automatic transmission of claim 1, wherein the first torque path is at least partially defined by the input, the first rotating torque-transferring mechanism, the sun gear of the second planetary gearset, and the sun gear of the third planetary gearset.

7. The automatic transmission of claim 1, wherein the second torque path is at least partially defined by the input, the second rotating torque-transferring mechanism, and the carrier assembly of the second planetary gearset.

8. The automatic transmission of claim 1, wherein:
the carrier assembly of the first planetary gearset is coupled to the ring gear of the second planetary gearset;
the carrier assembly of the second planetary gearset is coupled to the ring gear of the third planetary gearset; and the carrier assembly of the third planetary gearset is coupled to the sun gear of the fourth planetary gearset and the output.

9. The automatic transmission of claim 1, wherein the ring gear of the third planetary gearset is coupled to at least three carrier assemblies and one stationary torque-transferring mechanism.

10. The automatic transmission of claim 1, further comprising a third torque path at least partially defined by the input, the sun gear of the first planetary gearset, and the carrier assembly of the first planetary gearset.

11. A gear scheme for an automatic transmission, comprising:
   a transmission input and a transmission output, the input adapted to be coupled to a torque-generating mechanism;
   a first rotating torque-transferring mechanism and a second rotating torque-transferring mechanism, each being independently coupled to the transmission input;
   a first planetary gearset coupled to the first rotating torque-transferring mechanism, the first planetary gearset being coupled to a first stationary torque-transferring mechanism;
   a second planetary gearset coupled to the first planetary gearset and the first rotating torque-transferring mechanism, the second planetary gearset being coupled to a second stationary torque-transferring mechanism;
   a third planetary gearset coupled to the second rotating torque-transferring mechanism and the transmission output, the third planetary gearset being coupled to a third stationary torque-transferring mechanism; and
   a fourth planetary gearset coupled to the third planetary gearset and a fourth stationary torque-transferring mechanism;
   wherein, the fourth planetary gearset includes a sun gear, a ring gear, and a carrier assembly, the ring gear being coupled to the fourth stationary torque-transferring mechanism.

12. The gear scheme of claim 11, wherein the third planetary gearset comprises a sun gear, a ring gear, and a carrier assembly, the ring gear of the third planetary gearset being coupled to the carrier assembly of the fourth planetary gearset.

13. The gear scheme of claim 11, wherein the first planetary gearset comprises a sun gear, a ring gear, and a carrier assembly, the sun gear of the first planetary gearset being coupled to the transmission input and the ring gear of the first planetary gearset is coupled to the first stationary torque-transferring mechanism.

14. The gear scheme of claim 13, further comprising a torque path defined between the transmission input and transmission output, where the sun gear and carrier assembly of the first planetary gearset are disposed along the torque path.

15. The gear scheme of claim 11, further comprising a first torque path defined between the input and the output of the transmission, where the first rotating torque-transferring mechanism, an input of the second planetary gearset, an input of the third planetary gearset, and an output of the third planetary gearset are disposed along the first torque path.

16. The gear scheme of claim 11, further comprising a second torque path defined between the input and the output of the transmission, where the second rotating torque-transferring mechanism, a ring gear of one of the planetary gearsets, and at least two carrier assemblies of the planetary gearsets are disposed along the second torque path.

17. The gear scheme of claim 11, wherein the first rotating torque-transferring mechanism, second rotating torque-transferring mechanism, first stationary torque-transferring mechanism, second stationary torque-transferring mechanism, third stationary torque-transferring mechanism, and fourth stationary torque-transferring mechanism are engaged in combinations of at least two to establish at least seven forward speed ratios and two reverse speed ratios between the transmission input and the transmission output.

18. The gear scheme of claim 17, wherein the gear step between the first forward speed ratio and second forward speed ratio is about 1.5 or less.

19. The gear scheme of claim 11, wherein the third planetary gearset includes a ring gear being coupled to at least three carrier assemblies and the third stationary torque-transferring mechanism.

20. The gear scheme of claim 11, wherein:
   the first planetary gearset includes a carrier assembly being coupled to the second planetary gearset;
   the second planetary gearset includes a carrier assembly being coupled to the third planetary gearset; and
   the third planetary gearset includes a carrier assembly being coupled to the sun gear of the fourth planetary gearset and the transmission output.

* * * * *